May 17, 1960 J. S. AMNÉUS 2,936,577
ROCKET MOTOR THROTTLING INJECTOR
Filed Aug. 6, 1952

INVENTOR.
JOHN S. AMNEUS
BY
Arthur M. Smith
ATTORNEY

United States Patent Office 2,936,577
Patented May 17, 1960

2,936,577

ROCKET MOTOR THROTTLING INJECTOR

John S. Amnéus, Woodside, Calif., assignor to the Regents of the University of Michigan, Ann Arbor, Mich., a corporation of Michigan Application August 6, 1952, Serial No. 302,932

7 Claims. (Cl. 60—35.6)

The present invention relates to a rocket motor and more particularly to such a motor in which thrust is controlled over a wide range to provide desired operational characteristics of the motor at all times and under all intended operating conditions. The improvement of the present invention relates more particularly to the throttle control for said motor.

For the purposes of this specification, a "rocket motor" is hereby defined as a thrust-producing system which derives its thrust from the ejection of hot gases generated from combustible materials carried in the system; "thrust" as the resultant force in the direction of motion; "thrust range" as the ratio of maximum thrust to minimum thrust; and "throttling" as the process of varying the thrust of a rocket motor.

Thrust control of rocket motors has been a serious problem, prior to the present invention, because of the exacting operational requirements of such motors. Lacking a proper throttle control, it heretofore has been considered necessary to design a rocket motor either for low thrust operation or for high thrust operation. It, therefore, has been a continuing, but heretofore unobtained objective in rocket motor design to provide a single rocket motor which will permit both high and low thrust operation under conditions which permit a continuous control of the motor throughout its entire thrust range.

Solution of this problem has been made more difficult because of the exacting and critical operational requirements which are inherent in rocket motor operation. The most desirable rocket motor fuels are hypergolic, i.e., they are ignitable on contact. The quantity of gases produced on ignition must be positively controlled in the motor with high precision.

The gases resulting from ignition of the fuels are present in the motor under extremely high pressures, and high temperatures and are traveling at high velocities. Because of these conditions, failure to maintain precise operational conditions often results in disastrous explosions. Thus, in such motors, the reduction of the complex controls and the simplification in the number and kinds of parts required to be actuated before a desired control is obtained has been a desired but heretofore unobtainable objective in such motors.

Prior attempts to solve the problem of rocket motor thrust control as applied to airborne vehicles proposed the use of a plurality of rocket motors so that by turning these rocket motors on or off in different numbers, thrust variation is obtained. Such attempts were not satisfactory because of the weight factor involved in using a plurality of such motors. It was then considered that if a single rocket motor could be used and provided with a plurality of propellant orifices, each with an associated valve, such that these orifices may be individually opened or closed in different numbers, that thrust variation and control could be obtained. These methods are severely limited by the complexity of the control system necessary for smooth and efficient operation within the desired thrust ranges. When in operation such devices can only be fully on or fully off, so that since each orifice is either fully opened or closed, step throttling of the rocket motor is the only result.

Another prior approach to the problem of thrust control is to vary the elements upon which thrust depends. It is known that the thrust of a given rocket motor depends on a number of factors, one of the most important of which is the rate of flow of the propellants (fuel and oxidizer); this in turn depends principally on two quantities: (1) the area of the orifices through which the propellants must flow, and (2) the pressure differential to which the propellants are subjected. Expressed mathematically; $w = cA\sqrt{gp\Delta p}$ where $w$=the rate of flow, $c$=constant peculiar to the orifice area, $A$=cross sectional area of the orifice, $g$=gravitational constant, $p$=fluid density, and $\Delta p$ is the pressure differential.

The prior art methods are chiefly methods in which the variation in flow rate of the propellants is accomplished by varying the differential pressure between the feed pressure and the pressures within the mixing chamber. A severe limitation in using such differential pressure as the control factor for controlling the thrust ranges is the inability to develop the high pressure differentials required for the higher thrusts.

This problem is further aggravated by the fact that the rate of flow changes in proportion to the square root of change in magnitude of the differential pressure.

The obvious advantages of throttling by using area as the control factor prompted an attempt to vary thrust by varying the area of the exhaust nozzle. This, however, has thus far met with failure, principally because of the inability to find materials that can withstand the high temperatures, pressures and velocities of the exhaust gas stream and further because control at such point introduces disturbances in the flow pattern of the exhaust gas stream.

Furthermore, it has been observed that when throttling is accomplished by changing the pressure differential, in order to decrease the rate of flow, it is first necessary to decrease the pressure in the line leading to the mixing chamber orifice. The effect of this is to decrease the differential pressure across the orifice. This same effect results when the area of the exhaust nozzle is the control factor. The resultant effect on the performance of the rocket motor is that rough burning often occurs at the lower thrusts. It has been found by experiment, that this difficulty is substantially alleviated when the differential pressure across the orifice is increased as the rate of flow is decreased. Although the reason for this is not fully known, it is believed that such conditions assure a better spray pattern or formation of the propellants in the mixing chamber.

Regardless of the method used to vary the thrust in a rocket motor, it is necessary that a constant mixture ratio of propellants be maintained at all times. Thus, in methods of control where differential pressure is the control factor, it is necessary to provide appropriate mechanisms to synchronize the operation of the plurality of line valves required.

Furthermore, when certain propellants are used, it is important that an oxidizer lead be achieved on starting, and an oxidizer override be maintained during shutdown, to avoid explosions at these times. The oxidizer lead prevents the accumulation of large amounts of fuel before initial combustion takes place. The oxidizer override assures complete burning of any remaining fuel in the mixture in the combustion chamber at and during the shut off of the motor. Thus, to provide for this requirement, additional mechanisms must be added to the valve control mechanisms referred to previously.

As distinguished from these and other unsuccessful prior attempts, the present invention provides a single rocket motor which may be continuously controlled at all times throughout its operating range to regulate the thrust developed within its designed thrust ranges.

The principal objects of the present invention are:

(1) To provide a rocket motor in which the thrust characteristics are readily controlled by a continuous throttle means readily operable throughout the designed thrust range of the said motor.

(2) To provide a simplified continuous throttle means for a rocket motor which permits a positive precision control of said motor throughout its designed thrust range.

(3) To provide a rocket motor readily adapted for use over relatively wide thrust ranges and in which a simplified, effective throttle control is operated by a single mechanism to vary the flow rate of the propellants in direct proportion to variations in the propellant orifice area.

(4) To provide a simplified throttle control for a rocket motor in which: (a) an increase in differential pressure is created across the orifice area while decreasing the rate the flow; (b) a substantially constant mixture ratio of propellants is maintained at all feed rates; and (c) an oxidizer lead on starting and an oxidizer override during shutdown is provided.

(5) To provide a rocket motor having a positive throttle control operable over the entire thrust range of the motor and in which provision is made to vary the effective capacity of the fuel mixing chamber according to variations in the feed rate of propellants thereto.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawing, since the invention is capable of other embodiments and of being carried out in various ways. Also, it is to be understood that the phraseology or terminology employed herein is for the purpose of description and not of limitation.

Figure 1:
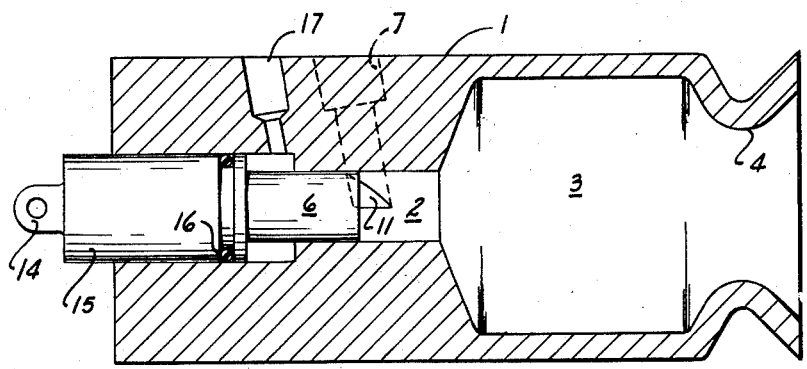
Fig. 1 is a longitudinal section through a rocket motor embodying the present invention.

Referring to Fig. 1 of the attached drawing, a rocket motor embodying the present invention is comprised of a rigid container 1 in which there is provided a cylindrical mixing chamber 2, a combustion chamber 3 and exhaust nozzle throat 4. The contour of the exhaust nozzle throat 4 is such that an efficient passage of exhaust gases is obtained in a required direction through the nozzle throat 4. The length of the mixing chamber 2 is varied by the movement of the throttle control plunger 6 to the end that the residence time of the propellants in the chamber at all times is less than the ignition delay time, so that all combustion is certain to occur only in the combustion chamber 3. The type of mixing chamber 2, here shown is known in the art as a swirl chamber, but as the present invention is operable as well with the impingement type of mixture chamber, it is not intended that the present invention be limited in this respect.

Figure 2:
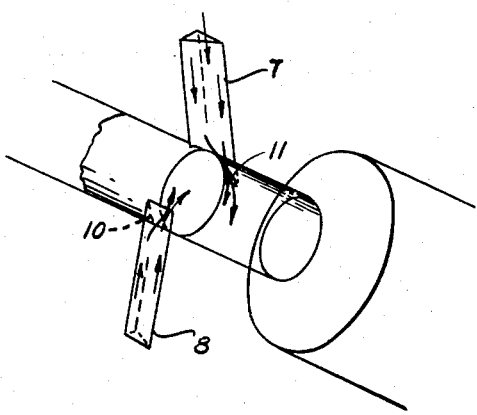
Fig. 2 is a fragmentary diagrammatic perspective view showing the propellant feed lines and inlet ports in combination with a throttle control member of the present invention.

The fuel injector 8 and oxidizer injector 7 (Fig. 2) are so constructed that the propellant fluids from these injectors enter the cylindrical mixing chamber 2 along its tangent.

Furthermore, these injectors are inclined to the axis of the mixing chamber so that fluids injected therefrom have a slight velocity component along the cylindrical mixing chamber 2. The angle of inclination of the injectors 7 and 8 assists in controlling the relation of the residence time to the ignition delay times of the propellants in the swirl chamber 2.

The injector orifices 10 and 11 are preferably rectilinear in cross sectional contour. As shown in the drawings they are shown as being triangular in shape. It has been found that such shape permits very exact flow control in the low thrust regions in which the orifices are partially closed. However, rectangular shaped orifices also have proved successful in such operations so it is not intended that the present invention be limited in this respect to any geometrical shaped orifice. A preference for the triangular shaped orifices is indicated since positive control may be more readily achieved because the area affected by a given amount of movement of the control member is a function of the then exposed area of the orifice. Thus, any error in movement of the control members at the lower flow rates has less effect than when the rectangular orifices are used.

It has been observed also that a more constant swirl pattern results at all throttle settings when the triangular orifices are used than is the case when the rectangular orifices are used.

Furthermore, the mathematics of the areas of the two orifices and their respective positions in the mixture chamber 2 are such that the areas change at each point in a movement from one extreme point to the other, in a constant ratio. The invention, however, is not to be limited in operations with only two orifices as shown, nor to any one constant ratio change of orifice area. Orifices would be made up of a series of small holes of any shape such that the ratio of density of oxidizer to fuel holes is that required to give the desired mixture ratio.

Figure 3:
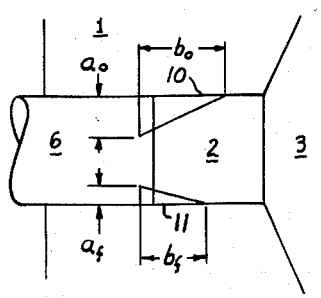
Fig. 3 is a diagrammatic view of the swirl chamber, propellant inlet ports and throttle control mechanism of the present invention on which I have placed the mathematical symbols to show the derivation of certain of the mathematical formulae and analyses herein set forth.

It is to be further noted that the oxidizer orifice 11 is so designed and arranged that when the fuel orifice 10 is completely closed, a small passable area yet exists at the oxidizer orifice. Reference at this time should be made to the diagrammatic view of the swirl chamber shown in Fig. 3. The above mentioned feature is obtained by making the distance $b_o$ slightly greater than the distance $b_f$ (subscripts referring to oxidizer and fuel respectively). Furthermore, the areas of the respective orifices as indicated by $a_o$ and $a_f$, are designed to be of the proper mathematical relationship to cause the fuel and oxidizer entering the swirl cavity to be of stoichiometric proportions at all times.

The movable plunger 6 of the throttle control is constructed and arranged substantially as shown so that it is free to reciprocate in the mixing chamber 2 and selectively close off or open up the desired effective areas of the orifices 10 and 11. The plunger 6 may be actuated by power means (not shown) which apply a force to the connector lug 14 on the enlarged exposed end 15 of the plunger 6. In a particular embodiment, the power means employed has been any suitable hydraulic pressure actuated mechanism having a suitable control therefor. This invention, however, is not to be limited to such mechanisms since many other types of power applying mechanisms are known which can effectively control the reciprocating movements of the plunger 6. Any suitable sealing member such as an O ring 16 is provided to assure a gas tight seal between the movable plunger and the cylinder wall.

A port 17 is provided to discharge at a point adjacent the entrance to the injectors 7 and 8 previously described. It is intended that gases such a nitrogen, carbon dioxide or air be supplied under pressure through this port to prevent the seepage of propellants or propellant gases between the movable plunger 6 and the walls of the mixing chamber 2.

The operation of the above described invention can best be understood by again referring to the attached drawing. On starting, the movable plunger 6 is at its extreme position to the right. In this position, both orifices 10 and 11 are completely closed by the plunger 6 and a sealing effect is had due to the seepage of nitrogen, or other gases supplied under pressure through the inlet 17 from behind the plunger 6, into the areas between the plunger 6 and the mixing chamber wall. As the plunger 6 is moved to the left, to the position shown in Fig. 1, the oxidizer orifice area 11 is the first to be opened. The oxidizer under pressure thus enters the mixture chamber 2. As the plunger 6 is moved further to the left, the fuel orifice area 10 is then opened and the fuel is caused to flow into the mixing chamber 2. The two fluids enter the cylindrical mixing chamber 2 along its tangent such that they swirl around the periphery of the chamber 2 and some mixing occurs. Each fluid furthermore has a slight velocity component along the mixture chamber by reason of its angle of injection. The fluids emerge from the mixing chamber 2 in the form of a hollow cone spray and enter the combustion chamber 3. In the combustion chamber 3 the mixing operation is completed and the now highly combustible mixture ignites and burns in such a manner that gases under high pressures are forced out of the exhaust nozzle throat 4 to give a forward thrust to the rocket motor.

As the throttle control plunger 6 is moved further to the left, effective passageable areas of each orifice 10 and 11 are simultaneously opened according to a constant ratio. Larger quantities of propellants under a constant pressure are thus permitted to enter the mixing chamber 2 similarly according to a constant ratio. Furthermore, the change in rate of flow occurs substantially in accordance with the formula $w = cA\sqrt{gp\Delta p}$ in that the rate of flow $w$ varies substantially directly as the effective discharge areas of orifices 10 and 11 are varied. This procedure is repeated along the entire movement of the plunger thereby giving a continuous variation in flow rates.

On the return stroke to the right, the same procedure occurs in the reverse manner. The following facts, however, are to be noted. First, the mixing chamber pressure being directly proportional to the rate of flow to the chamber, decreases as the rate of flow is decreased. Since the line pressure is held constant, as the rate of flow is decreased, the differential pressure across the orifice areas is increased. Second, when the plunger has moved to the right so as to completely close the passageable area of the fuel orifice 10, there is yet a slight passageable area at the oxidizer orifice 11 through which oxidizer is flowing.

In the operation of a rocket motor, immediately after the propellants enter the swirl cavity and before they enter the combustion chamber, proper mixing of the propellants must take place in order that efficient burning take place. Thus, the plunger 6 which controls the rate of flow of the said propellants must bear such a physical relationship to the incoming propellants that at no time will it interfere with the delicate mixing process mentioned above. It is to be noted that the movable member in its operations as herein described, is at all times adjacent to those portions of the mixing chamber where mixing is taking place.

It is to be noted that in all operations of the plunger 6 that the effective capacity of the mixing chamber 2 is varied at the same time the areas of the fuel and oxidizer orifices are varied. Thus, the chamber 2 is at its maximum designed capacity when the plunger 6 is moved to fully open the inlet ports 10 and 11 and is made progressively smaller as the plunger 6 is moved to close off the said ports. This variation in the capacity of the mixing chamber 2 assists in maintaining the desired differential between the residence time of the fuels in the chamber 2 and their ignition delay time at all feed rates of the fuels. Thus, flashbacks and explosions are largely eliminated in the rocket motor of the present invention.

The advantages of controlling the thrust of rocket motors by the method just described are readily apparent. These are:

(1) Rapid and wide variations in thrust with only one control device. In recent experiments, a two hundred pound rocket motor was continuously throttled over a thrust range of 36 to 1. Heretofore, thrust ranges beyond 10 to 1 were thought difficult to achieve by pioneering German technicians as well as American technicians.

(2) Exact control of mixture ratios by one mechanism.

(3) Control of the oxidizer lead on starting and the oxidizer override when shutting down by the same single mechanism.

(4) Continuous throttling over the entire designed thrust range.

(5) Simplicity of mode of operation.

(6) The low manufacturing cost of the apparatus required.

The above features are among the more important features of the present invention.

From the foregoing, it will be observed that I have provided a rocket motor which may be designed to operate over wide thrust ranges and in which a simple, precision throttle control is provided to assure optimum controlled operation continuously over the entire thrust range and in which the residence time of the propellant fuel mixture in the mixture chamber is controlled at all times to be less than the ignition delay time, thus assuring positive control over the place and extent of combustion desired with the substantial elimination of flashback and explosion hazards.

Having thus described my invention, I claim.

1. A rocket motor adapted for controlled operation over its entire designed thrust range and comprising a heat resistant body portion having a fuel mixing chamber communicating with a combustion chamber having an exhaust nozzle throat, a fuel inlet port opening into said fuel mixing chamber and communicating with a source of fuel, an oxidizer inlet port opening into said fuel mixing chamber and communicating with a source of oxidizer, and a throttle control member movable in said fuel mixing chamber and across said inlet ports to simultaneously vary the volume of said fuel mixing chamber and the effective discharge areas of said inlet ports, the downstream extremity of the said oxidizer inlet port extending beyond the downstream extremity of the said fuel inlet port whereby movement of the said throttle control member provides an oxidizer lead on starting the motor and an oxidizer override on shutdown thereof.

2. A rocket motor adapted for controlled operation over its entire designed thrust range and comprising a heat resistant body portion having a fuel mixing chamber communicating with a combustion chamber having an exhaust nozzle throat, a fuel inlet port of rectilinear shape opening into said fuel mixing chamber and communicating with a source of fuel, an oxidizer inlet port of rectilinear shape opening into said fuel mixing chamber and communicating with a source of oxidizer, and a throttle control member movable in said fuel mixing chamber and across said inlet ports to simultaneously vary the volume of said fuel mixing chamber and the effective discharge areas of said inlet ports, said oxidizer inlet port extending beyond the downstream extremity of the said fuel inlet port whereby movement of the said throttle control member provides an oxidizer lead on starting the motor and an oxidizer override on shutdown thereof.

3. A rocket motor adapted for controlled operation over its entire designed thrust range and comprising a heat resistant body portion having a fuel mixing chamber communicating with a combustion chamber having an exhaust nozzle throat, a fuel inlet port of triangular shape opening into said fuel mixing chamber and communicating with a source of fuel, an oxidizer inlet port of triangular shape opening into said fuel mixing chamber and communicating with a source of oxidizer, and a throttle control member movable in said fuel mixing chamber and across said inlet ports to simultaneously vary the volume of said fuel mixing chamber and the effective discharge areas of said inlet ports, said oxidizer inlet port extending beyond the downstream extremity of the said fuel inlet port whereby movement of the said throttle control member provides an oxidizer lead on starting the motor and an oxidizer override on shutdown thereof.

4. A rocket motor adapted for operation at a selected and variable thrust within its designed maximum and minimum thrust ranges and comprising a heat resistant body portion having a fuel mixing chamber communicating with a combustion chamber having an exhaust nozzle throat, a fuel inlet port opening into said fuel mixing chamber and communicating with a source of fuel, an oxidizer inlet port opening into said fuel mixing chamber and communicating with a source of oxidizer, and a throttle control member reciprocative in said fuel mixing chamber to simultaneously vary the volume of said chamber and the effective discharge areas of said inlet ports, the downstream extremity of the said oxidizer inlet port extending beyond the downstream extremity of the said fuel inlet port whereby reciprocation of the said throttle control member provides an oxidizer lead on starting the motor and an oxidizer override on shutdown thereof.

5. A rocket motor adapted for operation over a wide thrust range and comprising a heat resistant body portion having a fuel mixing chamber communicating with a combustion chamber having an exhaust nozzle throat, propellant inlets communicating with inlet ports opening in said fuel mixing chamber and a throttle member movable within said fuel mixing chamber to vary the effective areas of the said inlet ports according to the formula $w = cA\sqrt{gp\Delta p}$, where $w$=rate of flow of propellants, $c$=the constant peculiar to the orifice used, $A$=cross-sectional area varied, $g$=gravitational constant, $p$=fluid density of the propellants, and $\Delta p$=the differential pressure to which the propellants are subjected, at least one of said inlet ports being an oxidizer inlet port and said throttle member being arranged to open a portion of said oxidizer inlet port first on starting the motor to provide an oxidizer lead and to close a portion of said oxidizer inlet port last on shutting down of the motor to provide an oxidizer override.

6. A rocket motor adapted for operation over a wide thrust range and comprising a heat resistant body portion having a fuel mixing chamber communicating with a combustion chamber having an exhaust nozzle throat, propellant inlets communicating with inlet ports opening in said fuel mixing chamber and a throttle member reciprocative within said fuel mixing chamber to vary the effective areas of the said inlet ports according to the formula $w = cA\sqrt{gp\Delta p}$, where $w$=rate of flow of propellants, $c$=the constant peculiar to the orifice used, $A$=cross-sectional area varied, $g$=gravitational constant, $p$=fluid density of the propellants, and $\Delta p$=the differential pressure to which the propellants are subjected, at least one of said inlet ports being an oxidizer inlet port and having its downstream extremity extending beyond the downstream extremity of the remainder of said inlet ports whereby reciprocation of said throttle member provides an oxidizer lead on starting of the motor and an oxidizer override on shutdown thereof.

7. A rocket motor adapted for operation over a wide thrust range and comprising a heat resistant body portion having a fuel mixing chamber communicating with a combustion chamber having an exhaust nozzle throat, propellant inlets communicating with inlet ports opening in said fuel mixing chamber, at least one of said inlet ports being an oxidizer inlet port having its downstream extremity extending beyond the downstream extremity of the remainder of said inlet ports, and a throttle member similar in cross-section to the cross-section of said fuel mixing chamber and reciprocative therein to vary the volume of said fuel mixing chamber and to simultaneously vary the effective areas of the said inlet ports according to the formula $w = cA\sqrt{gp\Delta p}$, where $w$=rate of flow of propellants, $c$=the constant peculiar to the orifice used, $A$=cross-sectional area varied, $g$=gravitational constant, $p$=fluid density of the propellants, and $\Delta p$=the differential pressure to which the propellants are subjected.

References Cited in the file of this patent

UNITED STATES PATENTS

| | | |
|---|---|---|
| 940,162 | Kerr | Nov. 16, 1909 |
| 1,020,974 | Garbe | Mar. 26, 1912 |
| 2,434,298 | Truax | Jan. 13, 1948 |
| 2,457,595 | Orr | Dec. 28, 1948 |
| 2,555,082 | Goddard | May 29, 1951 |
| 2,580,529 | Dietz | Jan. 1, 1952 |
| 2,714,286 | Zucrow | Aug. 2, 1955 |